March 22, 1932. C. C. RICHARD Re. 18,395

PUNCH AND DIE RETAINER

Original Filed Oct. 22, 1927 2 Sheets-Sheet 1

INVENTOR.
CLEMENT C. RICHARD

BY

Charles E. Wiman

ATTORNEY.

March 22, 1932. C. C. RICHARD Re. 18,395

PUNCH AND DIE RETAINER

Original Filed Oct. 22, 1927 2 Sheets-Sheet 2

INVENTOR.
CLEMENT C. RICHARD

BY

Arnold E. Weaver

ATTORNEY.

Reissued Mar. 22, 1932

Re. 18,395

UNITED STATES PATENT OFFICE

CLEMENT C. RICHARD, OF BLOOMFIELD HILLS, MICHIGAN, ASSIGNOR TO ALLIED PRODUCTS CORPORATION, OF DETROIT, MICHIGAN, A CORPORATION OF ILLINOIS

PUNCH AND DIE RETAINER

Original No. 1,785,495, dated December 16, 1930, Serial No. 228,095, filed October 22, 1927. Application for reissue filed January 30, 1932. Serial No. 589,963.

This invention relates to punch and die retainers and the object of the invention is to provide a retainer for punch and dies in which the punch and die may be readily secured or removed and firmly held in position when secured therein.

A further object of the invention is to provide a punch and die retainer in which the punch or die is locked in its retainer and which may be easily unlocked to allow removal or replacement.

Another object of the invention is involved in the construction in which the punch or die is provided with a groove in the outer surface thereof extending transversely to its longitudinal axis and adapted to be engaged by a rotatable lock member carried by the retainer, the lock member being cut out so that when turned to a certain position the punch or die may be readily removed from its retainer.

Another object of the invention is to provide a cylindrical lock member having a slightly smaller radius than the radius of the notch in the punch or die, the said member being adapted to be turned by means of a spring to engage in the notch in the punch or die to place a transverse pressure on the punch or die.

A further object of the invention is to provide a punch or die retainer having a cylindrical lock member which is spring actuated to engage the punch or die and which may be manually released against the tension of the spring to allow removal or replacement of the punch or die.

A further object of the invention is to provide a means for maintaining a binding pressure on the punch or die while it is held in its retainer.

A further and primary object and feature of the invention is to provide a tool retainer having an aperture for the tool shank and a second aperture opening thereinto on one side in which a lock device is supported to turn on an axis eccentric to the axis of an arcuate notch provided in the tool shank to receive the same whereby a wedging relation between the lock member and tool shank is secured preventing longitudinal displacement of the tool in its aperture.

These objects and the several novel features of the invention are hereinafter more fully described and claimed and the preferred form of construction by which these objects are attained is shown in the accompanying drawings in which—

Figure 1:
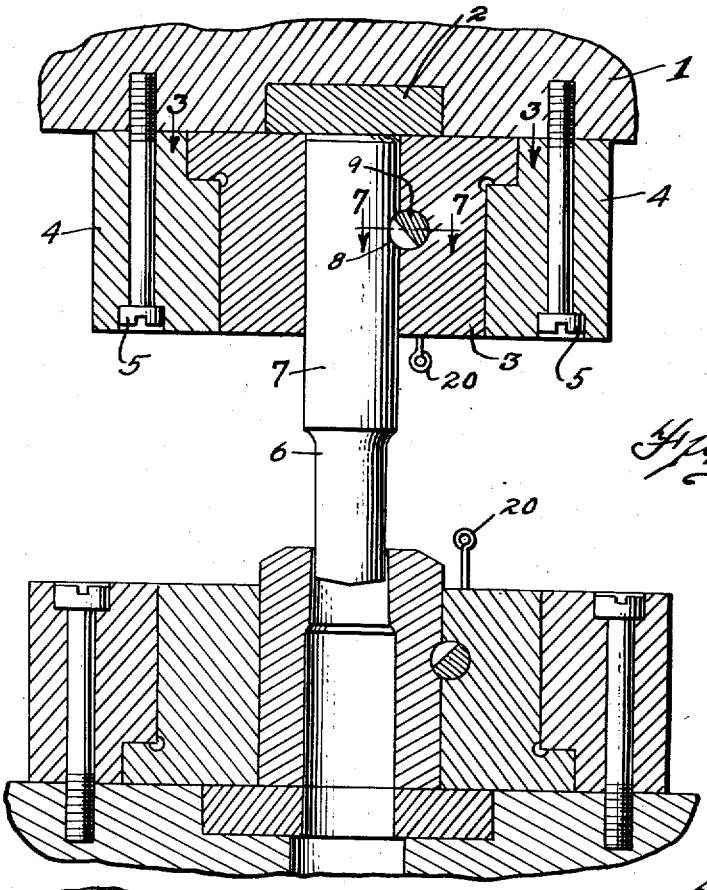
Fig. 1 is a section through a punch and die retainer embodying my invention.
Figure 4:
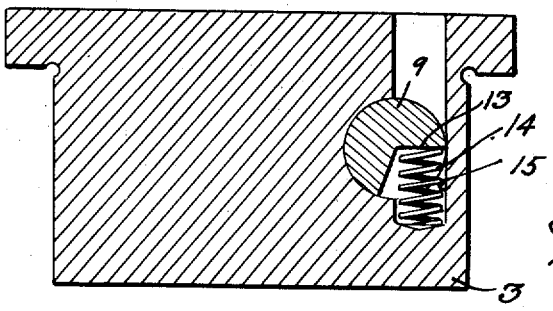
Fig. 4 is an enlarged section taken on line 4—4 of Fig. 3.
Figure 5:
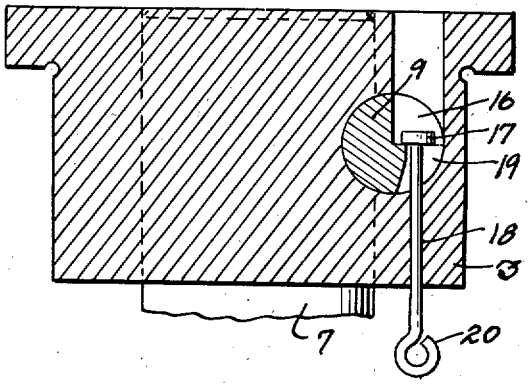
Fig. 5 is an enlarged section taken on line 5—5 of Fig. 3.
Figure 7:
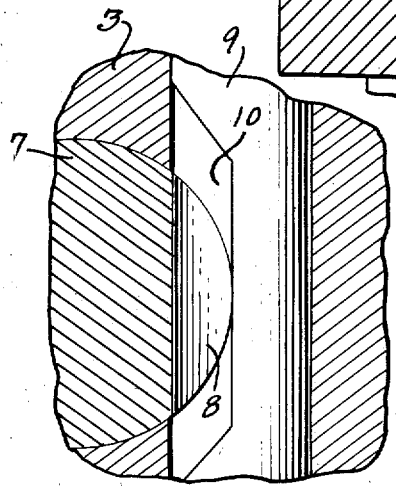
Fig. 7 is an enlarged section taken on line 7—7 of Fig. 1 showing the lock member in the unlocked position.

As shown in Fig. 1 a retainer is used for both the punch and the die. The punch is provided with a back plate 1 having a hardened steel insert 2 against which the punch shank seats. The retainer 3 is secured to the back plate 1 by means of a member 4 having cap screws 5 extending therethrough and threaded into the back plate 1. The punch 6 is provided with a cylindrical shank 7 fitting in the aperture provided therefor in the retainer 3 and the shank 7 is provided with an arcuate notch 8 in the outer surface thereof extending transversely to its longitudinal axis. A cylindrical lock member 9, shown more particularly in Fig. 7, is rotatably mounted in the retainer 3 and normally extends into the notch 8 in the punch shank 7. This member 9 is provided with a notch 10 which is cut to straddle the punch shank so that this member 9 may be turned and the notch 10 allows the punch shank to be inserted in its aperture in the retainer. When the punch shank has been inserted in the aperture the cylindrical member 9 may be turned into the notch 8 in the punch shank as shown in the upper part of Fig. 1 to prevent the removal of the punch. As it will be noticed in Fig. 2 the notch 8 is cut on a radius greater than the radius of the cylindrical member 9, the radius for the member 9 being struck from the center 11 and the radius for the notch 8 being struck from the point 12. The notch 8 is cut so that its inner surface is nearer the point 11 than the outer surface of the member 9 so that when the solid portion of the member 9 is turned into the notch 8 it places a pressure on the shank 7 and holds it in binding engagement with the wall of its aperture. In other words, the axes of the two notches are in an eccentric relation and for this reason the member 9 is limited in its turning movement on its longitudinal axis and usually only turns part way into the notch 8 due to its binding action. The member 9 as shown in Fig. 4 is provided with a notch 13 and a coil spring 14 is positioned in the recess 15 in the retainer 3 and engages in the notch 13 tending to turn the member 9 in a counter clockwise direction to the position shown in the upper part of the Fig. 1. This spring places a tension on the member 9 which provides a pressure for turning the member 9 into the notch in the punch shank. At the opposite end, as shown in Fig. 5, the member 9 is provided with a notch 16 for the head 17 of the release lever 18 and the release lever 18 extends through a slot 19 provided in the member 9. The lower end 20 of the release lever extends downwardly through the retainer 3 and this end may be grasped by the operator and may be pulled down to turn the member 9 in a clockwise direction against the tension of the spring 14 at the opposite end of the member 9 to bring the notch 10 into alignment with the punch shank aperture in the retainer. At this time the punch may be readily removed from the retainer 3 and replaced by a new punch, whereupon the operator releases the lever 20 allowing the spring 14 to turn the member 9 in a counter clockwise direction engaging the solid part of the member 9 in the notch 8 of the punch shank as shown in the upper part of Fig. 1.

Figure 6:
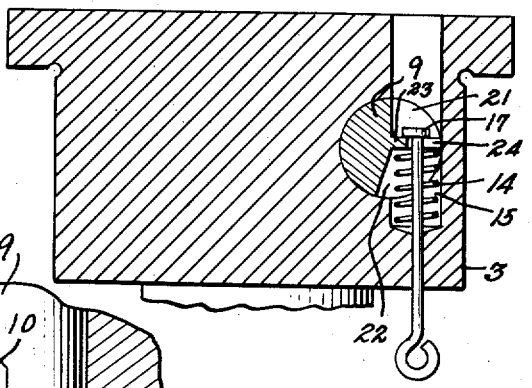
Fig. 6 is a similar section showing the spring and manual release lever combined at one point in relation to the lock member.

In the form shown in Fig. 6 the release lever and spring are combined at one point in the retainer. In this case the cylindrical member 9 is provided with a notch 21 at the top for the head 17 of the release lever and a notch 22 beneath the notch 21 for the spring 14. This provides a partition 23 which is slotted at 24 for the release lever and the spring 14 tends to turn the member 9 into locking engagement in the notch 8 of the punch shank while the member 9 may be turned in the opposite direction by drawing the release lever 20 downwardly.

The retainer shown in the lower part of Fig. 1 is an exact duplicate of the retainer shown in the upper part of the said figure, the only difference being that the retainer and member 9 are reversed in position and the die is held by the retainer instead of the punch. The particular use of this invention in punch and die work is that in work of this type in withdrawing the punch from the die considerable pressure is exerted as the punch tends to remain in the die and frequently the punch is pulled out of its retainer instead of being pulled out of the die. The object of this invention is to so firmly lock the punch and die in the respective retainers that they cannot be drawn out of the retainers during the operation and to provide a means for holding the punch and die in the retainer so that they are in absolute alignment for punching operations. While I have described this retainer as used for a punch and die, it is applicable for many other uses in which it is desired to firmly secure a member in its support so that it cannot be withdrawn except when released by the operator.

Due to the eccentric relationship of the lock member, the arcuate notch in the tool shank, and the spring tending to turn the lock member into the notch of the tool shank, the tool is held against its seat provided by the insert 2 and is held from longitudinal movement due to the wedging relationship of the lock member and tool shank which forces the same against the shank aperture opposite the point of engagement by the lock member. With punches, for instance, considerable strain is imposed on the tool upon its withdrawl from a punched aperture and if any lost motion is permitted between the tool shank and the insert the parts are soon out of condition and it is to prevent such lost motion that this lock member is provided. Under the arrangement described the spring so acts on the lock member as to turn the same into the tool shank aperture. On insertion of the tool shank into its aperture the lock member is turned out in the locking position, and as the notch of the shank comes to registration, it is automatically forced to the wedging relation with the tool. The device may therefore be made without any manual means for turning the lock member out of possible engagement with the tool. For convenience, however, a release lever is provided for manually turning the lock member when desired.

Figure 2:
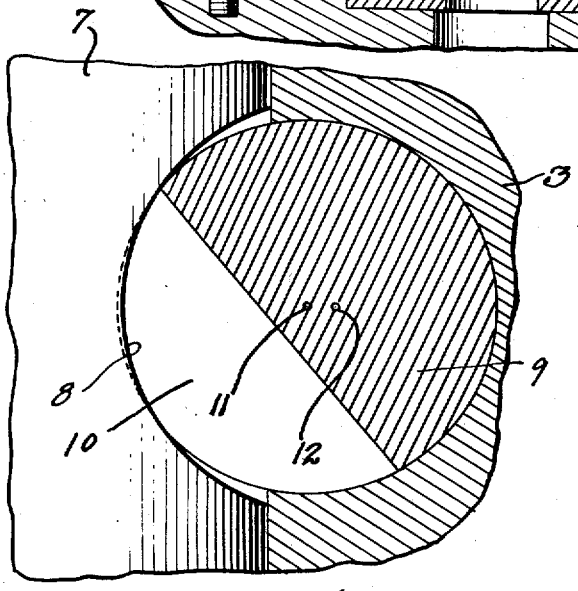
Fig. 2 is an enlarged section through the lock member similar to that shown in the upper part of Fig. 1.
Figure 3:
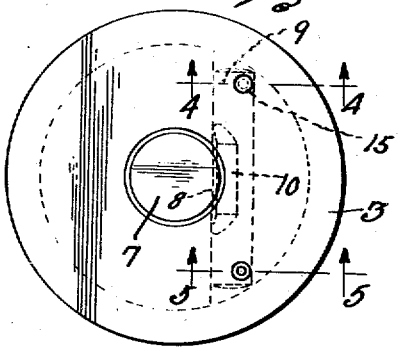
Fig. 3 is a section taken on line 3—3 of Fig. 1.

The locking member 9 is in effect an automatic clutch. It automatically locks the tool shank directly up against the tool seat or hardened insert 2 regardless of variations (within a given range) of the length of the tool, the exact position of the notch and wear, etc. The working part or contacting part of the locking member 9 is arranged to jam with the wall of the notch when any effort to withdraw the tool occurs. By reason of relieving the locking member just ahead of the contacting part by means of the notch 10, the contacting part of the lock member may enter the notch of the tool shank as shown in Fig. 2 and jam with the wall of the notch. Because of this relief of the lock member the jamming may take place at a variety of points along the wall of the notch down to substantially the full depth of the notch. This assures the locking of the tool shank against the seat 2 regardless of variations or wear and gives, because of the spring, a take-up or follow-up action which is very important in punches where there must be no looseness between the tool and its seat. At the same time the lock is a very strong one and will successfully resist the heavy draft in withdrawing punches from the work.

Furthermore, this relief is desirable and necessary where the locking member is journalled in a seat to turn on a substantially fixed axis, to wit; the center 11 as shown in Fig. 2, otherwise it would not be possible to get the tool in or out and past the locking member without removing that member.

The seating and journaling of the swinging locking member makes the retainer very strong. The lock is automatically turned into locking position by the spring 14. The surfaces are so arranged that any attempt to withdraw the tool is resisted. The component of the pulling stress tending to withdraw the tool from the retainer acts upon the locking member at right angles to a tangent to the notch through the point where the notch contacts with the locking member. Inasmuch as this notch is an arc having its center at 12, the force acts in the direction of a radius. This component therefore has a slight tendency to turn the locking member in clockwise direction and eject it from the notch but there are other forces that overcome this tendency. The friction between the wall of the notch and the periphery of the locking member is relatively great when the withdrawing force is large. An effort to pull the tool out, therefore, tends to rotate the locking member in a counterclockwise or locking direction and the component acting on the locking member being a much greater distance from the axis of rotation than the center of the arc through which the ejecting thrust passes this dragging force has a very great leverage advantage which preponderates adequately in favor of the locking movement rather than the releasing movement. Then too, the pressure of the spring aids in the locking.

The above is what I believe to be a correct statement of the action of the forces, but it is only my theory of the operation as now understood. The essential thing is that the locking member is so arranged with respect to notch or recess in the tool that the two are jammed to prevent tool withdrawal; and the locking member is relieved on the tool side so that the tool can be pushed in past the locking member and the locking member can automatically turn into the notch and jam with the wall of the notch. This jam occurs at any point from the top of the notch (as shown in Figure 2) to the mid-point of the notch, where the engaging part of the locking member happens to contact. On just which side of the axis of rotation the component of pulling stress tending to pull out the punch or die comes is unimportant provided the resultant of all the forces tends to rotate the lock to locking position. Inasmuch as there is no lock on the opposite sides of the shank, the lock securely jams the shank of the tool in its socket so there is no possible lateral movement or pivoting which is not permissible in punches.

From the foregoing description it becomes evident that the device is very simple and efficient in operation, will not easily get out of order, provides a means for firmly locking a member in its support and provides a device which accomplishes the objects described.

What I claim is:

1. In a retainer for punches, dies and similar tools, a member having an aperture for a tool shank or body, a lock member having a seat in the said first named member and having a part movable into the aperture for the shank, said tool shank having an arcuate notch formed therein on one side, the radius of which is greater than the radius of the part of the lock member turning thereinto and the axis of which is eccentric to the axis about which the lock member turns whereby by a mere turning of the lock member on its axis it may assume a wedging relation relative to the notch to prevent longitudinal movement of the tool in its aperture, and a spring tending to turn the lock member on its axis to locking engagement with the notch of the shank, the said first member, lock member, and notch of the tool being so complementally formed and arranged as to hold the tool shank from rotative movement in its aperture in said first member.

2. In a retainer for punches, dies and similar tools, a member having an aperture for a tool shank or body, a lock member having a seat in the said first named member and having a part movable into the aperture for the shank, said tool shank having an arcuate notch formed therein on one side, the radius of which is greater than the radius of the part of the lock member turning thereinto and the axis of which is eccentric to the axis about which the lock member turns whereby by a mere turning of the lock member on its axis it may assume a wedging relation with the notch to prevent longitudinal movement of the tool in its aperture, and means tending to turn the lock member on its axis to locking engagement with the notch of the shank, the said first member, lock member, and notch of the tool being so complementally formed and arranged as to hold the tool shank from rotative movement in its aperture in said first member.

3. In a retainer for punches, dies and similar tools, a member having a cylindrical aperture providing a sliding fit for a cylindrical tool shank or body, a lock member having a seat in the said first named member at one side of the said aperture and having a part movable thereinto, said tool shank having a notch formed therein on one side into which the lock member may turn when the notch is in registration therewith, the surface of the notch being so shaped relative to the lock member that a mere turning of the lock member on its axis causes a wedging engagement with the notch to thereby force the tool shank into pressure engagement with that side of its aperture opposite the lock member, and a spring tending to turn the lock member on its axis to engage the notch in the shank, the said first member, lock member and notch of the tool being so complementally formed and arranged as to prevent rotation of the tool shank in its aperture.

4. In a retainer for punches, dies and similar tools, a member having a cylindrical aperture providing a sliding fit for a cylindrical tool shank or body which is arranged to abut a tool seat at one end of said aperture, a lock member arranged to turn on a substantially fixed axis which lies crosswise of said aperture and having a seat in and by which it is pivoted in the said first named member at one side of the said aperture and having a tool engaging part movable thereinto, said tool shank having a notch formed therein on one side into which the lock member may turn when the notch is in registration therewith, the surface of the notch being so shaped and located when the tool abuts the seat, relative to the tool engaging part of the lock member and its center of rotation that a mere turning of the lock member on its axis causes a wedging and jamming engagement of said tool-engaging part of the lock member with the wall of the notch to thereby force the tool shank into pressure engagement with that side of its aperture opposite the lock member, a spring tending to turn the lock member on its axis to engage the notch in the shank, the said first member, lock member and notch of the tool being so complementally formed and arranged as to prevent rotation of the tool shank in its aperture and the lock member being relieved, on the tool side, from the full dimensions of the circle in which it swings whereby the said spring pressed lock member automatically locks the tool from withdrawal from its seat in any one of various positions the tool shank may at any time take, within a given range, when abutting said seat and to permit the tool to be entered in the aperture and seated against the tool seat and permit the tool engaging part of the lock member to turn into the notch, and the said locking member being further arranged so it can be, when desired, turned out of the notch in the tool to release the same.

5. Supporting means for a punch or the like of a type having a shank which is notched to provide an engaging surface inclined from the side of the shank inwardly thereof and away from the supported end of the shank, comprising a retainer having an aperture for receiving the shank, the supported end of the shank being arranged to abut against a seat, a pivoted lock member, a seat in the retainer in which the pivoted lock member is seated and journaled, said lock member having an engaging part which swings in an arc which projects into the aperture and conflicts with the said inclined surface of the notch of the tool shank when said tool shank abuts against said seat, said lock member being relieved adjacent to the said engaging part to clear the aperture for the tool shank for insertion and removal of the tool and to clear the wall of the notch of the tool shank when in locking position whereby the engaging part only may swing into jamming engagement with the said inclined engaging surface of the tool shank, and means exerting a swinging tendency upon the lock member to swing the said engaging part thereof into engagement with the inclined surface of the tool shank whereby the tool shank is urged toward the wall of said aperture opposite the lock member and held at all times against the seat by a jamming action between the said inclined engaging surface and said engaging part.

6. A punch or other tool retainer having in combination a member provided with an aperture arranged to have, when in use, at one end a tool seat, and to form a socket for a punch or other tool having a notch in the side thereof, said member having also an opening in one side of said aperture, a locking member seated in said retainer to turn through the said opening on a substantially fixed axis and which is arranged crosswise of the said aperture, the said locking member having a tool-engaging portion, the locking member ahead of the tool-engaging portion being relieved to permit the tool to be inserted in the aperture and also to permit the tool-engaging portion to enter the notch of the tool and jam with the wall thereof to lock the tool from any withdrawal movement through a range of positions along the wall of the notch where contact between the notch wall and the engaging portion of the locking member may be made in the seating of the tool against the said tool seat, and means tending to automatically turn the locking member into the tool socket, said lock being arranged to be withdrawn from the tool socket to permit release of the tool from the retainer.

In testimony whereof I affix my signature.

CLEMENT C. RICHARD.